United States Patent

[11] 3,617,723

[72] Inventor William J. Melvin
Costa Mesa, Calif.
[21] Appl. No. 14,151
[22] Filed Feb. 25, 1970
[45] Patented Nov. 2, 1971
[73] Assignee Collins Radio Company
Dallas, Tex.

[54] DIGITALIZED MULTIPLIER
12 Claims, 3 Drawing Figs.

[52] U.S. Cl. 235/164, 235/156, 235/165
[51] Int. Cl. G06f 7/39, G06f 7/52
[50] Field of Search 235/156, 164, 165

[56] References Cited

UNITED STATES PATENTS

| | | | |
|---|---|---|---|
| 3,489,888 | 1/1970 | Wilhelm et al. | 235/164 |
| 3,519,809 | 7/1970 | Iverson et al. | 235/164 |

OTHER REFERENCES

Liu and Bee, IBM Technical Disclosure Bulletin, Vol. 9, No. 2, July 1966, pgs. 171- 173. (235/164)

Chu, Digital Computer Design Fundamentals, McGraw-Hill Book Co., 1962, pgs. 445- 446. (A.U. 236)

Richards, Arithmetic Operations in Digital Computers, D. Van Nostrand Co., Inc., 1955, pgs. 155- 156. (A.U. 236)

*Primary Examiner*—Malcolm A. Morrison
*Assistant Examiner*—James F. Gottman
*Attorneys*—Henry K. Woodward and Robert J. Crawford

ABSTRACT: A binary number in sign-magnitude format is multiplied by a second binary number in two's complemented format. The second number is stretched by repeating its sign bit a number of times equal to the number of magnitude bits of the first number, and the second number is then two's complemented when said first number is negative. Gate means controlled by said second number provides summing means with said first number. Said summing means develops the partial product and final product of the multiplication.

INVENTOR.
WILLIAM J. MELVIN
BY H. K. Woodward
ATTORNEY

INVENTOR.
WILLIAM J. MELVIN
BY H. K. Woodward
ATTORNEY

INVENTOR.
WILLIAM J. MELVIN

BY H. K. Woodward
ATTORNEY

DIGITALIZED MULTIPLIER

This invention relates generally to digital techniques, and more particularly to method and means for performing multiplication of binary numbers.

The multiplication of binary numbers is performed by successive additions and shifting of the multiplicand. More specifically, the multiplicand is multiplied by each bit of the multiplier, starting with the least significant bit of the multiplier, and depending on whether the multiplier bit is a "1" or a "0", the multiplicand is added to the partial product of the multiplication operation. After each addition, the multiplicand is multiplied by the next bit of the multiplier, shifted, and again added to the partial product. This sequence is carried out until all bits of the multiplier have been utilized. If negative numbers are involved, sign bits associated with the binary numbers must be considered in determining the sign of the product.

An object of the present invention is a versatile method of multiplying positive and negative binary numbers and means for performing said multiplication.

Another object of the invention is an improved binary multiplier for multiplying one number in sign plus magnitude by a second number in two's complement form.

Yet another object of the invention is a method of multiplying binary numbers which is readily implemented.

Still another object of the invention is a binary multiplier which is especially useful in digital filter applications.

A feature of the invention is the use of two's complement numbers in performing multiplication.

Briefly, in performing a multiplication operation in accordance with the present invention, a multiplicand expressed in sign-magnitude form is sequentially multiplied by each bit of the multiplier expressed in two's complement form, or the two's complement thereof depending on the sign of the multiplicand, and the resultant is then added to the partial product. The process is readily implemented with conventional storage, logic and adder means.

The invention and objects and features thereof will be more fully understood from the following detailed description and appended claims when taken with the drawings, in which:

Figure 1:
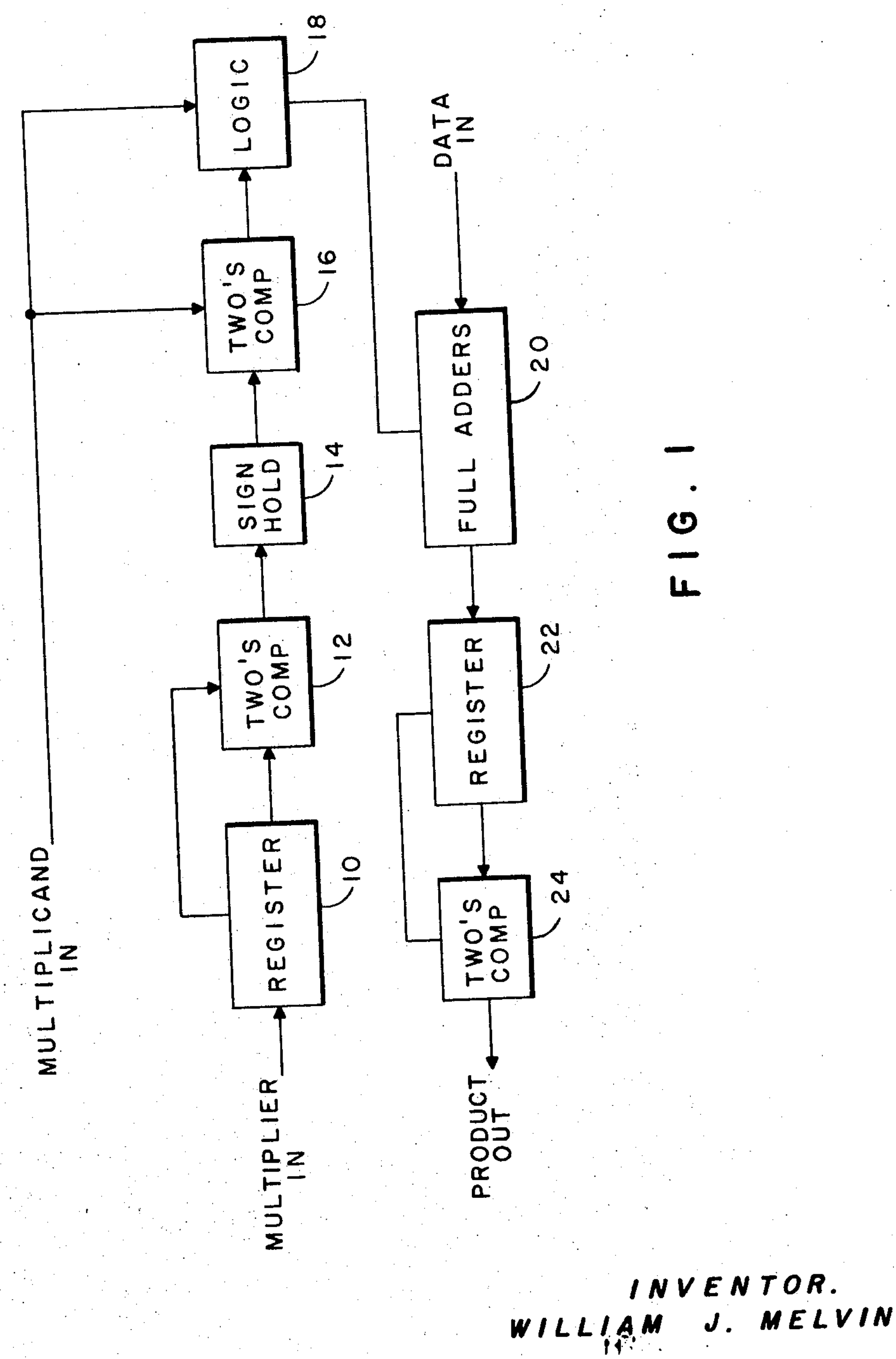
FIG. 1 is a block diagram of a multiplier in accordance with the present invention.

As above described, in multiplying binary numbers the multiplicand is multiplied by each bit of multiplier, starting with the least significant bit of the multiplier and, depending on whether the multiplier bit is a "1" or a "0", the multiplicand is added to the partial product of the multiplication operation. Further, if negative numbers are involved, sign bits associated with the binary numbers must be considered in determining the sign of the product. Typically, the sign bit of a binary number is indicated as a "1" for negative and a "0" for positive and follows the magnitude portion of the number, e.g., 1 0101 represents a negative number with magnitude of 0101, or −5.

The multiplication process in accordance with the present invention is especially designed for multiplying one number in sign-magnitude form by a second number in two's complement form, as is often found in computer applications. Further, if the first number or multiplicand is negative, the second number or multiplier including sign bits is two's complemented. For example, if both the multiplier and multiplicand are negative numbers, the multiplier, which is in two's complement form, is again two's complemented. Additionally, the sign bit of the multiplier must be held for a count equal to the number of bits in the multiplicand, thereby stretching the multiplier by a number of bits equal to the multiplicand with each of the stretched bits being the sign of the multiplier. That is, if the magnitude bits of the multiplicand is M and the magnitude bits of the multiplier is N, the resultant length of the multiplier is M+N+1 with the N bits being the magnitude part of the multiplier and the M+1 bits equal to the sign of the multiplier. When the product is a negative number, its magnitude will be expressed in two's complement.

Consider now the multiplication of the number 5 (101 in binary form) by the number 5 (101 in binary form). Further, consider each case where the two numbers may be either positive or negative. The multiplication of the two numbers is carried out using the magnitude binary expression of the multiplicand and the stretched binary expression for the multiplier, as follows:

| Multiplicand sign & magnitude | Multiplier 2's complement | After 2's complement and sign stretch | Product |
|---|---|---|---|
| 0 101(+5) | 0 101(+5) | 0000 101 | 0 011001(+25) |
| 0 101(+5) | 1 011(−5) | 1111 011 | 1 100111(−25) |
| 1 101(−5) | 0 101(+5) | 1111 011 | 1 100111(−25) |
| 1 101(−5) | 1 011(−5) | 0000 101 | 0 011001(+25) |

It will be noted that the multiplicand is expressed with four bits: three of the bits expressing the magnitude thereof and the fourth bit representing the sign thereof ("0" being positive and "1" being negative). The multiplier is expressed in two's complement form with a sign bit and three magnitude bits. With two's complemented numbers, the magnitude portion is expressed in true binary form if the sign bit is positive and in two's complemented form if the sign bit is negative. In the third column, the multiplier is stretched by repeating the sign bit for a count equal to the number of magnitude bits in the multiplicand. Further, where the multiplicand is a negative number the stretched multiplier including sign bits is two's complemented The fourth column is the product of the multiplication with the magnitude of the product expressed in two's when the product is a negative number. Each of the multiplication operations are illustrated as follows:

```
   +5 × +5
       101
  0000 101
  --------
       101
      000
     101
    000
   000
  000
 000
 ---------
 000011001
 Sign & Magnitude
```

```
   +5 × −5
       101
  1111 011
  --------
       101
      101
     000
    101
   101
  101
 101
 ---------
 001100111
 Sign & Magnitude 2's Complement
```

```
   −5 × −5
       101
  0000 101
  --------
       101
      000
     101
    000
   000
  000
 000
 ---------
 000011001
 Sign & Magnitude
```

```
   −5 × +5
       101
  1111 011
  --------
       101
      101
     000
    101
   101
  101
 101
 ---------
 001100111
 Sign & Magnitude 2's Complement
```

Referring now to the drawings, FIG. 1 is a functional block diagram of one embodiment of the invention. In the typical application for the present invention, one input, herein designated the multiplicand, is in sign plus magnitude format while the second number, herein designated the multiplier, is in sign plus magnitude two's complemented format. The effect of two's complementing a number is illustrated in FIG. 1 by shift register 10 and two's complementor 12. The multiplier is fed into a shift register 10 and the sign bit of the multiplier stored in the register is used to control a two's complementor 12. When the multiplier sign bit is positive, the two's complementor 12 is not activated and data from register 10 is fed through the complementor 12 without changing form. However, when the multiplier sign bit is negative the complementor 12 is activated and the magnitude data stored in register 10 is complemented therein. In complementing a binary number, each bit is examined starting with the least significant bit and upon reaching the first "1" all subsequent bits are reversed. That is, all "0's" following the first significant "1" bit are changed to "1's," and all "1's" after the first significant "1" bit are changed to "0's."

Data output from two's complementor 12 is fed through sign hold 14 which in effect increases the length of the multiplier by repeating the sign bit a number of times equal to the number of bits in the magnitude portion of the multiplicand. Normally, the multiplicand will be of constant length in all multiplication operations, thus the sign hold will then stretch each multiplier binary word by a fixed amount of bits. However, should a multiplicand of variable length be employed, a counter may be utilized to compute the number of bits therein, and the output of the counter is utilized to control the sign hold 14.

The output of sign hold 14 is passed to two's complementor 16 which is controlled by the sign bit of the multiplicand. When the multiplicand is positive, two's complementor 16 is not activated, and when the multiplicand is negative the two's complementor 16 is activated and all bits including the sign bits of the stretched multiplier are complemented. Thereafter, the multiplier is in proper form for implementing the multiplication function of the multiplicand in logic 18 and adder 20. Logic 18 and adder 20 cooperatively function to carry out the multiplication, shift and add function with respect to the partial product as described above. It is to be noted that additional data may be fed to adder 20 for addition to the product during the multiplication operation.

The output of adder 20 is in two's complement form and, depending, on the digital computation means, may be in compatible format for additional processing. However, if real sign and magnitude format, as opposed to two's complement format, is desired, the output of adder 20 is fed to a register 22 which stores the product in real binary form for positive numbers and in two's complement form for negative numbers. The sign bit of the product is used to control two's complementor 24 so that negative numbers will be complemented thereby rendering the product output in real binary form.

Figure 2:
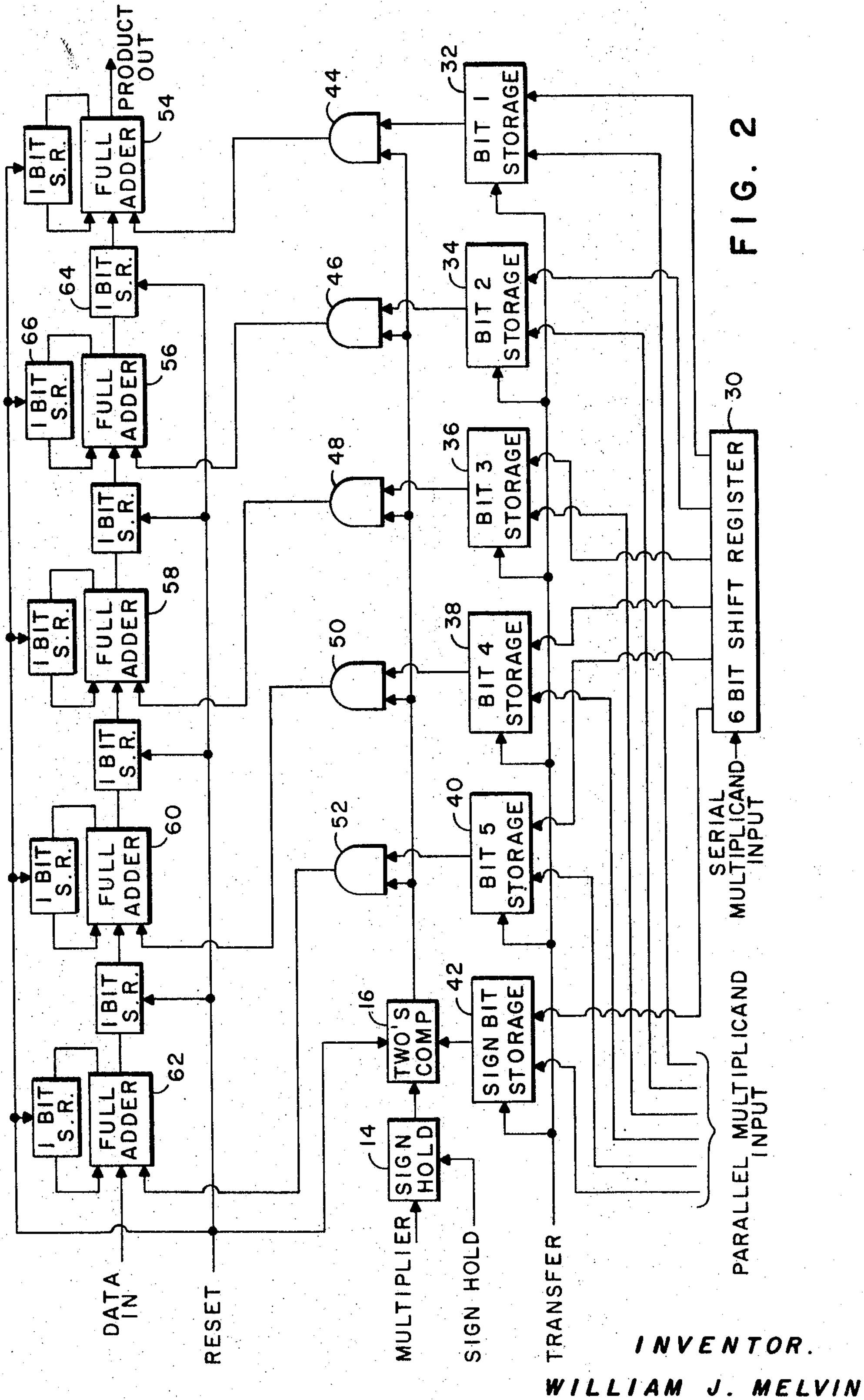
FIG. 2 is a functional diagram illustrating in more detail the elements of one embodiment of the invention.

FIG. 2 is a more detailed drawing of the input and logic portions of the multiplier of FIG. 1. The multiplicand may be fed in serially to a 6-bit shift register 30 (assuming a 5-bit magnitude plus 1-bit sign multiplicand), with the data in register 30 then being fed to storage registers 32–42. Alternatively, the multiplicand may be fed in parallel to the storage registers 32–42, as illustrated. The sign bit in storage register 42 is utilized to control the operation of two's complementor 16.

The stored data in registers 32–42 is applied to one input of AND gates 44–52, respectively, with the other input to each of the gates being provided by the multiplier. Thus, the magnitude bits of the multiplicand as stored in registers 32–42 are supplied through gates 44–52 to adders 54–62, respectively, each time a "1" bit from the multiplier is applied to gates 44–52. Multiplication is thus effected by adding the multiplicand to the partial product through means of full adders 54–62. Outputs of the full adders are provided to the inputs of the succeeding full adders through means of 1-bit shift registers 64. One bit shift registers 66 are provided to couple a carry, if any, from each full adder operation back onto the full adder for the next operation. Thus, it is seen that when a bit is provided through one gates 44–52 to a full adder, the full adder sums the bit along with the output of the preceding full adder and the carry from its one bit shift register 66.

Figure 3:
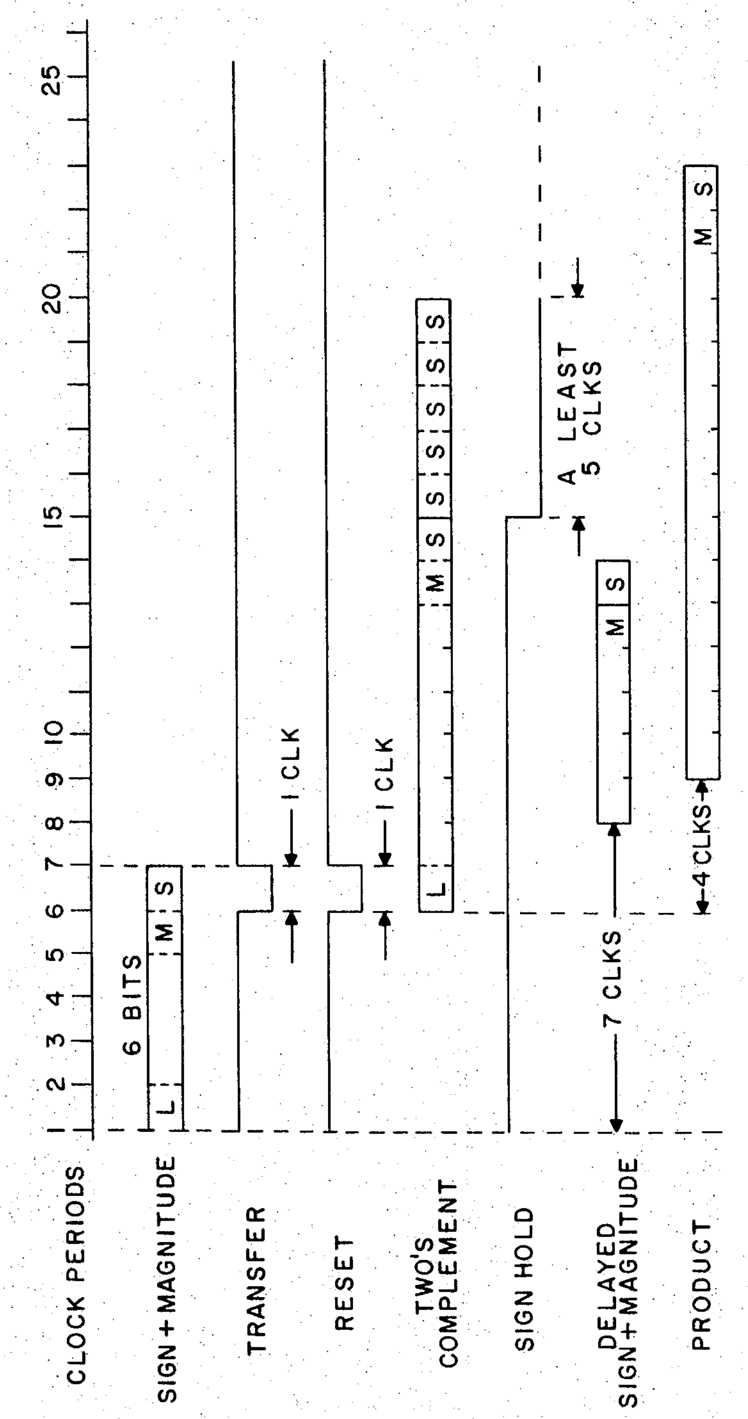
FIG. 3 is the timing diagram for the circuit of FIG. 2.

Timing for the operation of the circuit of FIG. 2 is illustrated in FIG. 3. Beginning with clock period 1, the sign and magnitude of the multiplicand is serially fed into shift register 30 during the first six clock periods. Upon the arrival of the sign bit during the sixth clock period, or later, a transfer signal allows the data from shift register 30 to transfer to storage registers 32–42. Concurrently, the full adders and the two's complementor 16 for the stretched multiplier are reset for the impending multiplication. Assuming two's complementor 16 is activated, the stretched multiplier is two's complemented, beginning with the least significant bit of the multiplier, during clock periods 6 through 19 (assuming an 8-bit multiplier word plus sign bit). It will be noted that sign hold 14 stretches the multiplier by at least five bits (equal to the number of magnitude bits in the multiplicand) by repeating or holding the sign bit an additional five clock periods. The product of the multiplication appears at the output of full adder 54 beginning with clock period 10 which is four clock periods following the reset signal. The four clock periods are required for two's complementing the multiplier input, gating the least significant multiplier bit and least significant multiplicand bit in gate 44, and applying the output of gate 44 to full adder 54.

When a third number is to be added to the product, said third number must be present in the plurality of full adders, with least significant bit in full adder 54, at the beginning of the multiplication and summing operation of the full adders.

The described multiplier has operated accurately at a processing rate of 1 MHz. Further, the logic elements required in implementing the multiplier lend themselves to MOS fabrication techniques. While the invention has been described with reference to specific embodiments, the description is illustrative and not to be construed as limiting the scope of the invention. Various modifications and changes may occur to those skilled in the art without departing from the spirit and scope of the invention as defined by the appended claims.

I claim:

1. The method of multiplying first and second binary numbers in sign plus magnitude form in a binary computer when the first number is in two's complement form comprising the steps of:
   - stretching said first number a number of bits equal to at least the number of magnitude bits of said second number by repeating the sign bit of said first number;
   - two's complementing said stretched first number when the sign of said second number is negative;
   - gating said second number by said stretched first number beginning with the least significant bit of said first number; and
   - applying said gated first number to summing means.

2. The method of multiplying first and second binary numbers in a binary computer expressed in sign plus magnitude form comprising the steps of:
   a. expressing said first binary number in sign plus M magnitude bits format;
   b. expressing said second binary number in sign plus N magnitude bits format;
   c. two's complementing said N magnitude bits of said second binary number if the sign thereof is negative;
   d. stretching said second binary number by repeating the sign bit at least M times;
   e. two's complementing said stretched second binary number when the sign of said first binary number is negative; and
   f. gating said first binary number by each bit of said second binary number beginning with the least significant bit and extending through said sign bits and sequentially adding the gated first binary number to the partial product to obtain a final product having M plus N magnitude bits followed by a product sign bit, said M plus N magnitude bits being in two's complement form when said sign bit of the product is negative.

3. A binary multiplier comprising:
   - first means for receiving and storing a first number in sign plus magnitude form;
   - second means for receiving a second number in sign plus magnitude two's complemented form;
   - third means connected for receiving said second number from said second means for stretching said second number by repeating the sign bit thereof at least a number of times equal to the bits of magnitude of said first number;

fourth means connected for receiving said stretched number from said third means and connected for receiving polarity indications of said first number, said fourth means two's complementing said stretched second number in response to said first number being negative;

a plurality of full adder means equal in number to the number of magnitude bits of said first number; and gating means connected between said first, fourth, and full adder means for receiving said first number and said stretched second number from said first and fourth means, respectively, for applying the magnitude bits of said first number to said full adder means, said gating means operating in response to each bit of said stretched second number, said full adder means performing the multiplication of said first and second binary numbers by adding said first number to a partial product in response to said gating means to thereby produce a product which is in sign plus magnitude form with said magnitude being two's complemented when the sign of said product is negative.

4. A binary multiplier as defined by claim 3 wherein said first means for receiving and storing a first number includes a shift register and a plurality of storage registers.

5. A binary multiplier as defined by claim 3 wherein said gating means comprises a two input AND gate function with the inputs to said gating means being provided by binary bits of said first and second numbers.

6. A binary multiplier as defined by claim 3 and further including:

shift register means connected for receiving the output from said full adder means; and two's complementing means connected for receiving the output of said shift register means for complementing the output from said plurality of full adder means in response to a negative sign bit for said output.

7. A binary multiplier as defined by claim 3 and further including an input for connection to said plurality of full adder means for providing a third binary number which is added to said product during said partial product operation.

8. The method of multiplying first and second numbers in a binary computer wherein the first number is expressed in two's complement format comprising the steps of:

two's complementing the first number if the sign of the second number is negative;

applying said second number to a plurality of gates;

gating each one of said plurality of gates by said first number; and sequentially adding the outputs of said plurality of gates as said first and second numbers are gated therethrough.

9. The method of claim 8 comprising in addition the step of holding the sign of said first number for at least a number of data bit periods so that the total number of bits for the first number is equal to the total number of bits of said second number.

10. Apparatus for multiplying first and second binary numbers wherein said first number is in two's complement format comprising, in combination:

first and second means for supplying data bit signals indicative of said first and second numbers, respectively;

third means connected to said first and second means for two's complementing the number received from said first means when the sign of said second number is negative;

fourth means connected to said second and third means for sequentially adding the parallel representation of said data bit signals received from said second means in partial product form in accordance with serial data bits received from said third means.

11. Apparatus as claimed in claim 10 comprising, in addition:

means, cooperating with said first means, for stretching said binary number received from said first means by repeating the sign bit thereof at least a number of times so that the word length of the binary number will equal the number of magnitude bits of said number supplied by said second means.

12. Apparatus as claimed in claim 10 comprising in addition means for two's complementing the output signal from said fourth means when the sign bit of the signal received therefrom is negative.

* * * * *